United States Patent [19]

Logan

[11] Patent Number: 4,891,337
[45] Date of Patent: Jan. 2, 1990

[54] SHAPED REFRACTORY PRODUCTS AND METHOD OF MAKING SAME
[75] Inventor: Kathryn V. Logan, Roswell, Ga.
[73] Assignee: Georgia Tech Research Corporation, Atlanta, Ga.
[21] Appl. No.: 901,766
[22] Filed: Aug. 28, 1986
[51] Int. Cl.$^4$ .................... C04B 38/00; C04B 35/10; C04B 35/58
[52] U.S. Cl. ......................................... 501/80; 501/96
[58] Field of Search ................................... 501/96, 80
[56] References Cited

U.S. PATENT DOCUMENTS 4,540,475 9/1985 DeAngelis ........................... 501/96
4,647,405 3/1987 Debely ............................... 501/96

Primary Examiner—Mark L. Bell
Attorney, Agent, or Firm—Hurt, Richardson, Garner, Todd & Cadenhead

[57] ABSTRACT

The method of making a foamed, low density shaped refractory product consisting of $TiB_2$ and $Al_2O_3$ which comprises the steps of foaming an exothermic reaction mixture consisting of $TiO_2$, $B_2O_3$ and Al, loading the reaction mixture into a self sustaining shape, locally igniting the shaped reaction mixture in air at ambient conditions and recovering the foamed, low density, shaped refractory product.

4 Claims, 2 Drawing Sheets 1 inch 1 inch

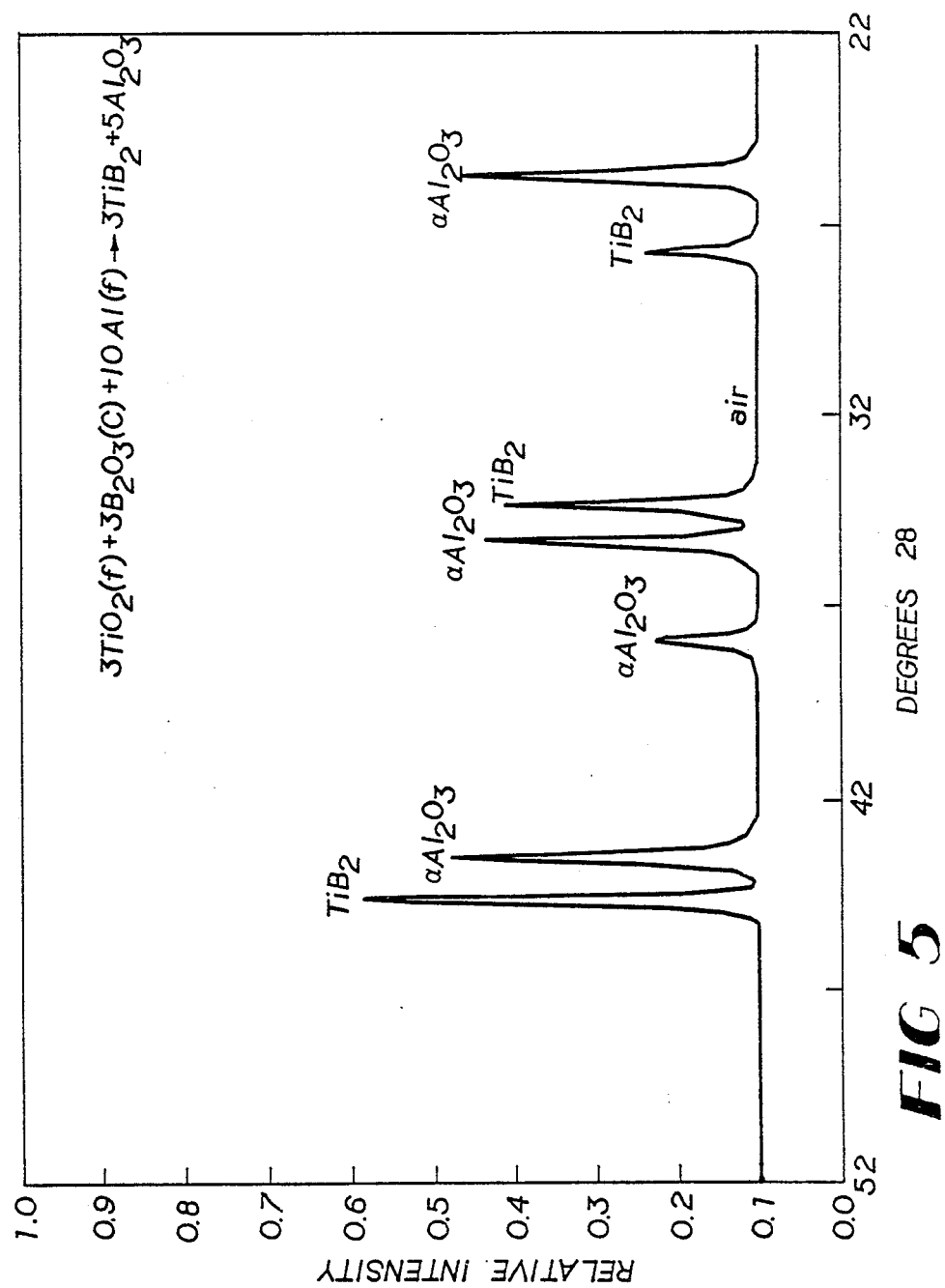

SHAPED REFRACTORY PRODUCTS AND METHOD OF MAKING SAME

BACKGROUND OF THE INVENTION

This invention was made with government support under contract No. DAAG46-83-K-0163 awarded by the Department of the Army. The government has certain rights in this invention.

The so-called thermite reaction traditionally involves the exothermic reduction of iron oxide with aluminum, in which the reaction produces molten iron with an aluminum oxide slag floating thereon, the reaction taking place either in a suitable mold so that the molten iron is fusion cast into a desired shape or at a site where two metal parts are to be joined to produce a weld between such metal parts when the reaction is completed.

Although there are prior patents which involve the use of the thermite type reaction to produce borides, carbides, silicides and nitrides and the like, the product produced by the reaction is of at least two phases, one which is a layer of the boride, carbide, etc., and another which is a layer of the oxide of the reducing metal such as aluminum or magnesium. That is, the reducing metal oxide is present as a separate layer of slag, as in the classical thermite reaction. If special steps are taken to produce a composition which is a mixture of the boride, carbide, etc. and the reducing metal oxide, such composition is not a foamed product.

UK Pat. No. 1,497,025 teaches the production of cast refractory inorganic products by a thermite type reaction in which slag is formed and the product is a dense, sintered form. Thus, the teaching of this patent is directed to producing a composition which is not a mixture, homogeneous or otherwise, of all the reaction products, but of a composition which is a mixture of the reaction products less the oxide of the reducing metal and (to the extent possible) less the CO which is formed during the reaction. This patent is specifically directed to avoid "poorly sintered specimens" of the desired product and to avoid products which are characterized by "porosity and the presence of free carbon therein, which affects their strength". To this end, the patent teaches a method which is carried out at a centrifugal acceleration of from 100 to 1,500 g and in a gaseous medium under pressure of 1 to 100 atm, using an inert gas such as argon. In this patent, the reaction mixture contains carbon and a reducing metal such as aluminum plus one or more metal oxides. The end product in each case is divided into two layers, a top layer of slag which is the reducing metal oxide and the bottom layer which is the desired material. Even if the constraints taught by this patent are not followed and porosity is present, it is not present in a composition which includes the reducing metal oxide.

Present techniques of producing refractory, monolithic shapes involve initial shape-forming steps such as hydraulic or isostatic pressing, slip-casting, extrusion, injection molding and the like prior to the firing step. Moreover, the firing step normally involves at least preheating the entire reaction mixture either to ignition temperature or to an elevated temperature at which local ignition and subsequent completion of the reaction occurs.

The invention is directed to improvements over existing techniques.

In contrast to the prior art teachings, the invention herein relates to the discovery that precisely shaped, foamed, monolithic and thus highly insulative refractory articles may be produced in situ by controlling the particulate sizes of the reaction components which form the reactive mixture and the composition of the article being a substantially homogeneous dispersion of the products of reaction.

The invention relates to monolithic, shaped refractory articles which are of foamed nature yielding densities substantially less than the theoretical density of the composition of the article, and the method of making such articles.

This invention involves a powdered exothermic reaction mixture which may be loosely packed into a desired self sustaining shape and dimensions which, after local ignition and resultant reaction in air under ambient conditions, yields a foamed, monolithic article faithfully reproduced in the desired shape and dimensions.

The composition of the article is a substantially homogeneous mixture of the reaction products of the reaction mixture.

The foamed nature of the article, yielding a density less than that of the theoretical density of the composition of the article; and the ability of the reaction mixture to complete its reaction after local ignition in air under ambient conditions and to yield an article faithfully reproducing the shape and dimensions into which the reaction mixture has been loosely packed, are attained by controlling the particle sizes of the components of the reaction mixture and employing aluminum as the reducing metal of the exothermic reaction mixture.

The compositions of the articles of this invention are the reaction products of a thermite type reaction substantially homogeneously dispersed throughout the article and the article itself is characterized by its foamed nature and its faithful reproduction of the dimensions and shape into which the reaction mixture has been loosely packed.

The composition of the articles of this invention is preferred to be $TiB_2$ in $Al_2O_3$.

The reactive mixture of this invention is easily shaped by lightly packing it in a mold cavity defining the desired shape and dimensions of the article, the material defining the mold cavity being made of any suitable material which is capable of withstanding the temperatures involved during the reaction and which do not require great structural integrity other than to confine the lightly packed reactive mixture and retain the desired shape of the article before and during the reaction.

Moreover, the particulate size control renders the molded reactive mixture locally ignitable in air under atmospheric conditions without preheating the mass thereof, after which ignition the reaction proceeds to completion throughout the reaction mixture to produce the shaped article.

The method of this invention, then, is both energy and cost efficient and of minimal complexity, capable of allowing the production of shaped articles of highly refractory, insulating properties due not only to the composition of the article but also to the foamed nature thereof.

Insofar as the critical feature of particulate sizes of the components of the reaction mixture is concerned, I have found that all components must be of powder form to pass a screen of 50 mesh size, that is, not being retained on mesh size of larger openings. By mesh size is meant U.S. Standard mesh.

However, with respect to the ability of the reaction mixture to be ignited locally and thereafter react to completion in air under ambient conditions it has been found that the reaction mixture must contain a substantial amount of $TiO_2$ which is of $-300$ mesh size, of $B_2O_3$ which is of $-100$, $+200$ mesh size or less and of Al which is of $-100$, $+200$ mesh size or less.

The method of this invention does not require a special environment or other special preparation and/or reaction procedures such as preheating the reaction mixture mass, the use of controlled atmosphere during reaction, the application of centrifugal effect before or during reaction or the use of pressure to pre-form the reaction mixture. The "green" condition of the shaped reaction mixture prior to ignition is simply as a mass of powder which is loosely packed so as to attain the desired shape. Under these circumstances, ignition takes place in response to local heating in air at atmospheric pressure and may be effected by local heating as by a resistance heated nichrome wire until ignition occurs, whereafter the exothermic reaction progresses through the reaction mass until complete. A further advantage of the present invention is that the reaction achieves a less violent conversion of reactants to product than prior thermite reactions.

In accord with this invention, it is to be noted that the article formed is a composition derived from the two oxides which are present in the reaction mixture. Although it is preferred that this composition be that which results from stoichiometric amounts of these two components and of the reducing metal, it is not strictly necessary for successful compositions. For example, when titanium dioxide ($TiO_2$) and boron oxide ($B_2O_3$) are combined with aluminum in the reaction mixture, an excess of boron oxide will produce a composition which is titanium diboride ($TiB_2$) plus the excess boron oxide plus aluminum oxide ($Al_2O_3$) formed during the reaction. Similarly, if the reaction mixture were formed of stoichiometric amounts of the two oxides and an excess of the reactive metal aluminum, the product would be titanium diboride plus aluminum plus aluminum oxide.

The above and other objectives of the invention will become more apparent as the description proceeds.

BRIEF DESCRIPTION OF THE DRAWING FIGURES

FIG. 5 is an X-ray diffraction chart of products formed by the invention.

DETAILED DESCRIPTION OF THE INVENTION

Figure 1:
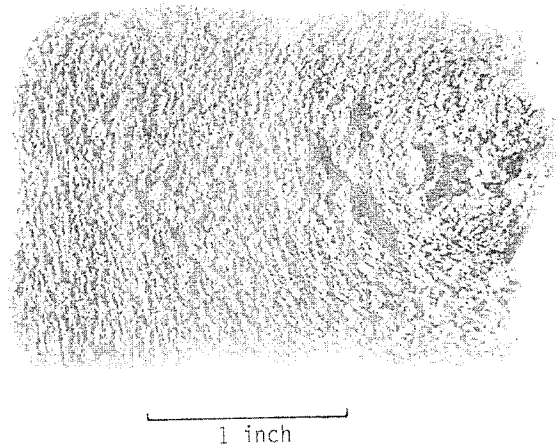
FIG. 1 is a microphotograph illustrating the ideal, substantially homogeneously foamed nature of products made according to the invention.

Reference to FIG. 1 illustrates the ideal, substantially homogeneously foamed nature of products made according to this invention. The article whose microphotograph is illustrated in FIG. 1 has the composition $TiB_2$-$Al_2O_3$ and is a highly refractory and hard product having a density of less than about 50% of the theoretical density of the composition, titanium diboride plus alumina. The following Examples will demonstrate the invention.

Example 1

Figure 3:
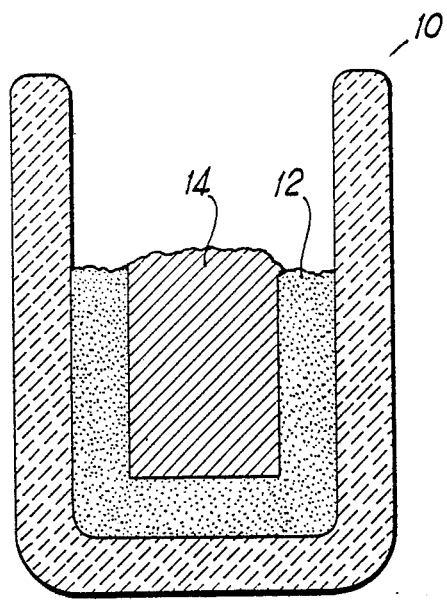
FIG. 3 is a vertical section taken through an SCFS crucible containing a reaction powder mixture according to this invention and having a core of powdered alumina, prior to ignition.
Figure 4:
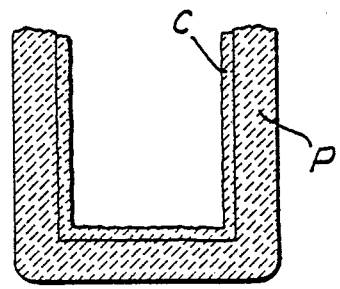
FIG. 4 is a view similar to FIG. 3 but illustrating the product attained after ignition and cooling and before removal of the core.

The stoichiometric reaction mixture consisting of 8.34 parts by weight $TiO_2$ of $-300$ mesh particle size, 9.39 parts by weight $B_2O_3$ of $-100$, $+200$ mesh particle size, 7.27 parts by weight Al of $-100$, $+200$ mesh particle size, intimately mixed, formed the powdered reaction mixture. An amount of this mixture was loosely packed in a slip-cast fused silica (SCFS) crucible 10 as in FIG. 3 between the crucible and a suitably shaped core (not shown) and the core was removed to leave the shaped reaction mixture mass 12 within the crucible 10. The core space was then filled with $-200$, $+300$ $Al_2O_3$ powder 14 and the reaction mixture was ignited in air under ambient conditions by means of an electrically heated nichrome wire (not shown). The ignition temperature was 1577° F. Upon ignition, the exothermic reaction proceeded throughout the reaction mass at a rate of about 25 mm/sec. to completion. The appearance of the reacted mixture and core material C was as is shown in FIG. 4, the article P having a homogeneously foamed nature as in FIG. 1, whose outer surface assumed the exact shape of the inner surface of the crucible 10 and whose inner surface assumed substantially the same shape as the originally formed core space. The core C was of substantially the same composition as the starting filler material 14 (alumina) and although fused by the heat of the reaction, was easily removed from the crucible shape of the article P. The weight per volume of the article P was found to be about 1.44 gm/cm$^3$ which, based upon the theoretical density of the composition of the article, represents about 30–40% thereof.

Figure 2:
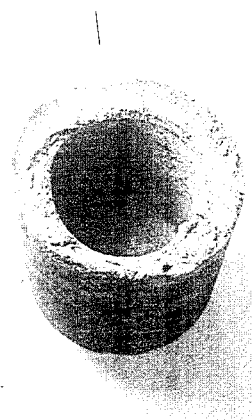
FIG. 2 is a photograph of a shaped refractory product of the present invention.

FIG. 2 is a photograph of the resulting article P. FIG. 5 illustrates a typical X-ray diffraction trace of the article P and indicates that the composition of the article is $TiB_2$ and $Al_2O_3$. X-ray diffraction traces of samples of other articles obtained from reaction of the aforesaid reaction mixture in air or argon under pressure of 1–100 atmospheres showed little, if any, difference in composition, although in samples which had been ignited in air under pressure, small amounts of TiN could be observed. Also, samples ignited and reacted in argon under pressure tended to densify and begin phase separation.

Example 2

In this example, the same stoichiometric components of the reaction mixture were uniformly mixed but in this case, the particulate size of the Al was changed to $-300$ mesh, the reaction mixture otherwise being the same as in Example 1. When this reaction mixture was subjected to local heating as in Example 1, ignition took place at 1230° F. but the resultant article was not homogeneously foamed as was the case with Example 1 and as depicted in FIG. 1. Instead, the porosity was uneven so that uniform refractory performance was not attained.

Example 3

In this example, the same stoichiometric components of the reaction mixture were uniformly mixed but in this case, the particulate size of the $B_2O_3$ was changed to $-300$ mesh, the reaction mixture otherwise being the same as in Example 1. The reaction mixture was ignited in air as in Examples 1 and 2 by local heating. Even though the crucible shattered during the reaction, the reaction product resulted in a foam similar to that of Example 1 which retained the crucible shape. The weight of the material after ignition was 23 grams, less than that of Example 1.

Example 4

In this example, the same stoichiometric components of the reaction mixture were uniformly mixed but in this case all three of the components were −300 mesh particle size. Again, ignition was by local heating in air. The reaction proceeded as in Example 7 with the crucible being shattered. The reaction product was a foam similar to that of Example 7 except that the center melted. The weight of the material after ignition was 21.5 grams.

Examples 5–8

In these Examples all of the remaining eight possible particulate size combinations of −100, +200; −300 of the reaction mixture were made and ignition attempted. However, none both ignited and sustained the reaction in air under ambient conditions as in Examples 1 and 2 and no article, foamed or otherwise was formed.

Example 9

In this Example, three parts by weight of the reaction mixture of Example 2 was mixed with one part by weight of the reaction mixture of Example 1. Ignition in air under ambient conditions took place and the reaction went to completion, producing an article which was substantially homogeneously foamed as in FIG. 1 and having about the same density. Thus, the presence of about 25% of the $TiO_2$ of −300 mesh size with the remainder being of −100, +200 mesh size improved the foaming characteristic of Example 2 to the ideal, substantially homogeneous foamed article.

Example 10

It was noted that if the powder was loosely placed in a crucible which did not restrict the shape, a friable, loose homogeneous mass was obtained.

I claim:

1. The method of making a shaped refractory product in which the product is of foamed nature having a density substantially less than the theoretical density of the composition of the product, the composition of the product consisting of $TiB_2$ in $Al_2O_3$, which comprises the steps of:

forming an exothermic reaction mixture of components consisting of $TiO_2$, $B_2O_3$ and all, which all of the components are of particle size to pass through a 50 mesh screen, a substantial portion of the Al is of a particle size which will not pass through a 300 mesh screen, and at least a substantial amount of the $TiO_2$ passes through a 300 mesh screen, loading the reaction mixture into a self sustaining desired shape, locally igniting the shaped reaction mixture in air at ambient conditions, and recovering the shaped foamed refractory product after the reaction has been completed.

2. The method as defined in claim 1 wherein the $B_2O_3$ and the Al are of −100, +200 mesh size.

3. The method as defined in claim 1 wherein the shaped foamed refractory product which is recovered consists of $TiB_2$ substantially uniformly dispersed in $Al_2O_3$.

4. The method as defined in claim 1 wherein the shaped foamed refractory product which is recovered has a density of not more than about 50% theoretical density.

* * * * *

UNITED STATES PATENT AND TRADEMARK OFFICE
CERTIFICATE OF CORRECTION

PATENT NO. : 4,891,337
DATED : Jan. 2, 1990
INVENTOR(S) : LOGAN, Kathryn, V.

It is certified that error appears in the above-indentified patent and that said Letters Patent is hereby corrected as shown below:

COLUMN 6, LINE 16:

"$TiO_2$, $B_2O_3$ and all," should be "$TiO_2$, $B_2O_3$ and Al,"

Signed and Sealed this

Twenty-first Day of June, 1994

Attest:

BRUCE LEHMAN

Attesting Officer    Commissioner of Patents and Trademarks